US012154717B2

(12) United States Patent
Chu

(10) Patent No.: US 12,154,717 B2
(45) Date of Patent: Nov. 26, 2024

(54) METHOD OF FABRICATION OF COMPOSITE MONOLITHIC STRUCTURES

(71) Applicant: The MITRE Corporation, McLean, VA (US)

(72) Inventor: Alejandro Chu, Madison, AL (US)

(73) Assignee: THE MITRE CORPORATION, McLean, VA (US)

( * ) Notice: Subject to any disclaimer, the term of this patent is extended or adjusted under 35 U.S.C. 154(b) by 980 days.

(21) Appl. No.: 16/990,408

(22) Filed: Aug. 11, 2020

(65) Prior Publication Data

US 2020/0373051 A1 Nov. 26, 2020

Related U.S. Application Data

(63) Continuation of application No. 15/674,790, filed on Aug. 11, 2017, now Pat. No. 10,741,317.

(51) Int. Cl.
*H01F 27/32* (2006.01)
*H01F 5/06* (2006.01)
(Continued)

(52) U.S. Cl.
CPC ............... *H01F 5/06* (2013.01); *H01F 19/00* (2013.01); *H01F 27/288* (2013.01);
(Continued)

(58) Field of Classification Search
CPC .......... H01F 5/06; H01F 19/00; H01F 27/288; H01F 27/323; H01F 41/122; H01F 41/125
See application file for complete search history.

(56) References Cited

U.S. PATENT DOCUMENTS

| | | | |
|---|---|---|---|
| 3,608,052 | A | 9/1971 | Gunn |
| 10,741,317 | B2 | 8/2020 | Chu |

(Continued)

FOREIGN PATENT DOCUMENTS

| | | | |
|---|---|---|---|
| JP | 2004131538 | A | 4/2004 |
| JP | 2006017169 | A | 1/2006 |

(Continued)

OTHER PUBLICATIONS

Non-Final Rejection directed to U.S. Appl. No. 15/674,790, mailed Dec. 4, 2019; 5 pages.

(Continued)

*Primary Examiner* — Tuyen T Nguyen
(74) *Attorney, Agent, or Firm* — Sterne, Kessler, Goldstein & Fox P.L.L.C.

(57) ABSTRACT

Fabricating composite monolithic structures to achieve optimal electrical, thermal, and mechanical properties through the elimination of air is discussed herein. A method of fabricating a composite structure includes coating an insulating layer with an uncured binding material and performing a first curing process on the uncured binding material to form a first stage cured binding material on the insulating layer without introduction of air pockets in a conventional manufacturing atmospheric environment. The method further includes disposing the insulating layer on an array of conductive structures. The first stage cured binding material is positioned between the insulating layer and the array of conductive structures. The method further includes performing a second curing process on the first stage cured binding material to form a cured binding material, and forming cured regions between adjacent conductive structures of the array of conductive structures.

8 Claims, 5 Drawing Sheets

(51) Int. Cl.
*H01F 19/00* (2006.01)
*H01F 27/28* (2006.01)
*H01F 41/12* (2006.01)

(52) U.S. Cl.
CPC ......... *H01F 27/323* (2013.01); *H01F 41/122* (2013.01); *H01F 41/125* (2013.01)

(56) References Cited

U.S. PATENT DOCUMENTS

| | | | |
|---|---|---|---|
| 2016/0221275 | A1 | 8/2016 | Pujar |
| 2019/0051438 | A1 | 2/2019 | Chu |

FOREIGN PATENT DOCUMENTS

| | | | | |
|---|---|---|---|---|
| JP | 4046214 B2 * | 2/2008 | | |
| WO | WO-2015057911 A1 * | 4/2015 | ............... | H01F 5/02 |

OTHER PUBLICATIONS

Notice of Allowance directed to U.S. Appl. No. 15/674,790, mailed Apr. 3, 2020; 7 pages.

* cited by examiner

METHOD OF FABRICATION OF COMPOSITE MONOLITHIC STRUCTURES

RELATED APPLICATIONS

This application is a divisional of U.S. Non-provisional patent application Ser. No. 15/674,790, filed on Aug. 11, 2017, issued as U.S. Pat. No. 10,741,317 titled "Method of Fabrication of Composite Monolithic Structures," and the contents of which are hereby incorporated herein by reference in its entirety.

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract Nos. W15P7T-13C-A802, W56KGU-14-C-0010, and W56KGU-16-C-0010 awarded by the Missile Defense Agency.

BACKGROUND

Field

This disclosure is generally directed to the fabrication of composite monolithic structures for applications, for example, in power, automotive, marine, aircraft, and/or spacecraft industries for which electrical and/or mechanical performance parameters are optimized with the elimination of air in the composite structure.

Background

Many systems require components comprised of materials exhibiting electrical and or mechanical properties that determine the critical performance parameters of the finished product. Composite monolithic structures incorporating textile, polymer, carbon, or metallic filaments as fibers, tubes, conductors, or sheets have applications in the aforementioned industries due to their electrical or mechanical properties, or both. Namely, the composite structure in an electrical application may achieve outstanding power density at high voltages and power dissipation capability; in a mechanical application, the composite structure may achieve high tensile strength at low weight. In all cases, the composite structure may be designed and tailored to maximize the attributes from the material properties such as dielectric constant, electrical and thermal conductivity, tensile strength of all the components, including that of the resin that binds the composite. Without exception, the material properties of air is inferior to that of the aforementioned items in the list.

Current methods for fabrication of composite monolithic structures incorporate air in the composite structure, which is detrimental to achieving the desirable high electrical or mechanical performance parameters necessary for some applications, or involve complicated process conditions. Composite monolithic structures fabricated using current methods may exhibit poor reliability under high stress applications and may fail prematurely in comparison to structures fabricated using the design and fabrication approaches described in this disclosure.

SUMMARY

Accordingly, elimination of air in the fabrication of the composite is an important technical contribution of the method of fabrication in this disclosure. Provided herein are embodiments for fabricating composite structures that are more reliable and exhibit higher performance than that of current approaches, and in addition achieve lower life-cycle cost by virtue of their reliability. The embodiments may also provide a streamlined process with reduced processing time and at lower cost.

According to some embodiments, a method of fabricating a composite structure includes coating an insulating layer with an uncured binding material and performing a first stage curing process on the uncured binding material to form a first stage cured binding material on the insulating layer. The method further includes disposing the insulating layer on an array of conductive structures. The first stage cured binding material is positioned between the insulating layer and the array of conductive structures. The method further includes performing a second stage curing process on the first stage cured binding material to form a second stage cured binding material, and forming second stage cured regions between adjacent conductive structures of the array of conductive structures.

According to some embodiments, a method of fabricating a composite structure includes coating an insulating layer with resin formulated for a 2-stage curing process. Namely, coating the insulating layer with said resin, performing a first stage curing process of the coated layer to form a uniform non-tacky binding resin coating on the insulating layer. The method further includes disposing the insulating layer on an array of conductive structures or another insulating layer. The first stage cured binding material is positioned between the insulating layer and another insulating layer or an array of conductive structures. The method further includes performing a second stage curing process on the first stage cured binding material to form through the merging of first stage cured layers to forming upon the second and final curing process fully cured regions between adjacent insulating layers and/or monolithic structures comprised of insulating and arrays of conductive structures.

According to some embodiments, a method of fabrication a composite structure includes coating a fiber material with an uncured binding material and performing a first curing process on the uncured binding material to form a first stage cured binding material on the fiber material. The method further includes winding the fiber material on a mandrel and performing a second curing process on the wound fiber material to form a fiber wound composite structure.

According to some embodiments, an electrical device includes a composite monolithic structure that includes an array of conductive structures and an array of insulating regions. Use of multiple thinner insulating layer to achieve the desired combined total thickness facilitates the fabrication process in these embodiments. The insulating regions of the array of insulating regions and conductive structures of the array of conductive structures are positioned in an alternating configuration with respect to each other to achieve the necessary dielectric field strength when the conductive layers are powered and connected to the appropriate voltage source. Once power is applied, the insulating layers may be immersed in electric fields, which they may sustain with necessary reliability margin. The composite monolithic structure further includes a first insulating layer coupled to the array of conductive structures and a second insulating layer positioned between the first dielectric layer and the array of conductive structures. The first insulating layer has a first dielectric field strength and the second insulating layer has a second dielectric field strength that is greater than the first dielectric field strength.

Further features and advantages of the present disclosure, as well as the structure and operation of various embodiments of the present disclosure, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings are incorporated herein and form a part of the specification.

Figure 3:
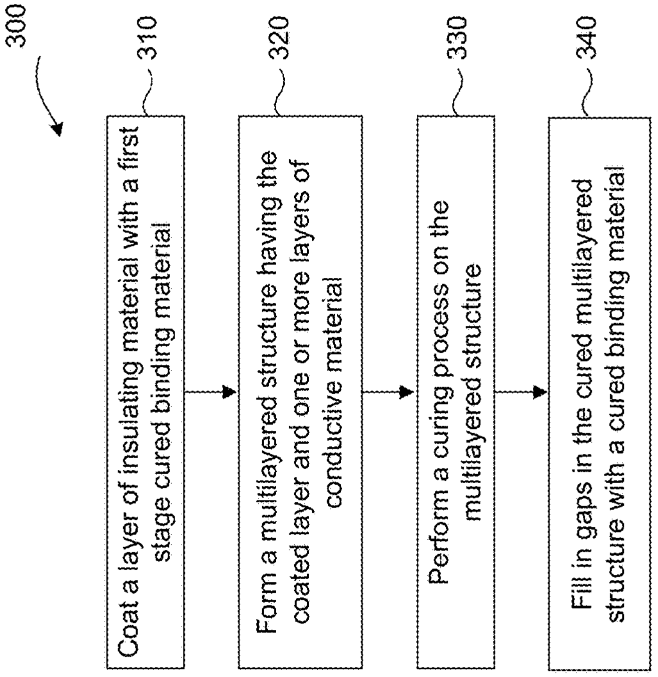
FIG. 3 is a flow diagram of a method for fabricating a composite structure, according to some embodiments.

The present disclosure will now be described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

The present disclosure provides embodiments for improving the fabrication and performance of composite monolithic structures for applications, for example, in electrical power, automotive, marine, aircraft, spacecraft, sporting goods, and/or protective gear and armor industries, just to name some examples. The example of embodiments may achieve higher performance and reliability, thus more cost effective for the applications and more convenient for fabricating the composite monolithic structures with desired performances than current fabrication methods.

The examples of embodiments disclosed herein substantially eliminate and/or prevent the inclusion of air pockets in the fabrication of composite monolithic structures. The substantial reduction and elimination of air pockets in the composite monolithic structures may be necessary to improve, for example, the electrical and mechanical performances of these structures (e.g., the breakdown voltage and thermal dissipation of coil-windings in dry type transformers). The presence of air pockets in these structures, for example, may lower the dielectric breakdown of the insulating layer in electric fields, decrease the thermal dissipation of heat, decrease the mechanical tensile strength of the composite insulating layers under thermal cycling, and lower the binding strength between layers of these structures, and consequently, have a negative impact on the electrical and structural integrity of these structures. Composite monolithic structures used in electrical equipment (e.g., transformer, insulating structures, coils in rotary equipment) may have electro-mechanical structures comprised of insulating and conducting systems that may generate heat due to resistive losses and the presence of air pockets in these structures may, for example, lower the dielectric breakdown voltages of these insulating systems, decrease thermal conductance and consequently, have a negative impact on the performance of these devices.

Figure 1:
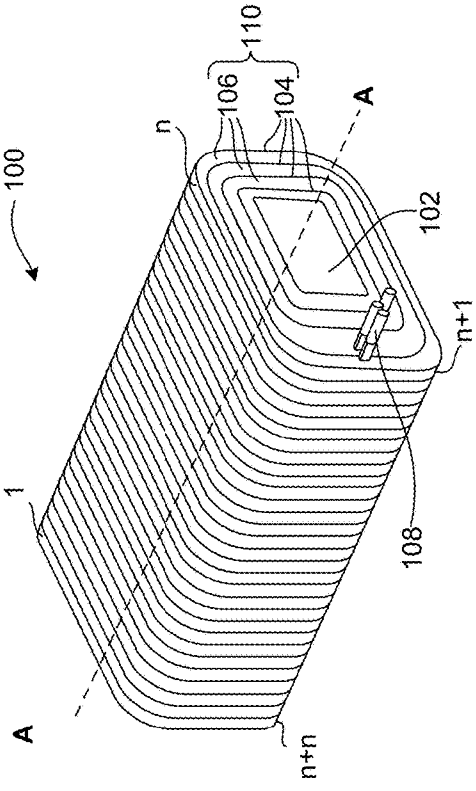
FIG. 1 is a schematic isometric view of a transformer, according to some embodiments.

FIG. 1 is an isometric view of a transformer 100, according to some embodiments. Transformer 100 may be a dry type transformer, although this disclosure is not limited to that example. Transformer 100 may include a magnetic core 102, a plurality of layers of coil windings 104 wound over magnetic core 102, and cooling tubes 108 running through layers of coil windings 104, according to some embodiments. Each layer of coil windings 104 may include n number of turns. In some embodiments, n may be any integer greater than 1. Transformer 100 may further include layers of insulating material 106, according to some embodiments. Each of the layers of insulating material 106 may be positioned between each pair of adjacent layers of coil windings 104. Each of the layers of insulating material 106 may be configured to electrically isolate adjacent layers of coil windings 104 from each other. In some embodiments, each of the layers of insulating material 106 may be bound to adjacent layers of coil windings 104 by a cured binding material (not shown in FIG. 1) and may form a composite monolithic structure (also referred herein as "composite structure") 110 in FIG. 1 having layers of coil windings 104, layers of insulating material 106, and/or the cured binding material. Based on the disclosure herein, a person of ordinary skill in the art will recognize that composite structure 110 having other elements (e.g., cooling tubes 108) of transformer are within the scope and spirit of this disclosure.

In some embodiments, layer of insulating material 106 may include a sheet of insulator such as Nomex®, Thermo-Guard®, or a suitable dielectric constant (K) material, and may have a thickness ranging from about 4 mil to about 15 mil. In some embodiments, layer of insulating material 106 may include a stack of two or more layers of insulating material bound to each other by a binding material. In some embodiments, the binding material may be a resin such as, for example, epoxy or polyester that may have an ability to be cured in two stages at two different times, and may have chemical and mechanical stability over time under an operational environment of temperature and thermal stresses. The incorporation of a two-stage-curing resin to facilitate fabrication is one of the novel aspects of this disclosure that surpasses conventional design and fabrication of composite structures for electrical equipment.

Figure 2:
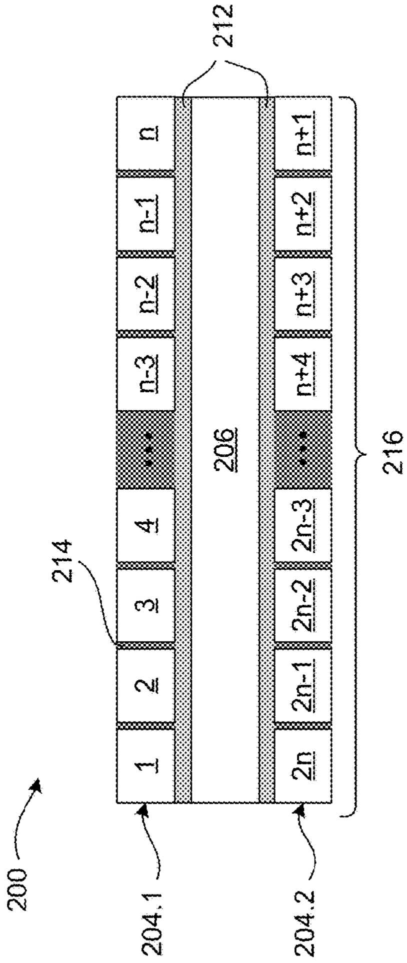
FIG. 2 is a schematic cross-sectional view of a composite structure of a transformer, according to some embodiments.

FIG. 2 is a cross-sectional view of a composite structure 200 of an electrical device (e.g., coil winding of a dry type transformer, high voltage devices, surge protection devices, and/or devices having electric fields and insulating systems, to name just some examples), according to some embodiments. Composite structure 200 may include layers of conductive material 204.1 and 204.2, a layer of insulating material 206 positioned between layers of conductive material 204.1 and 204.2, and a first binding material 212, according to some embodiments. Under operational conditions there may be electric fields between the conductive materials 204.1 and 204.2. Layer of insulating material 206 may be designed and configured to withstand the aforementioned electric fields, according to some embodiments. Layer of insulating material 206 may be configured to electrically isolate layers of conductive material 204.1 and 204.2 from each other. First binding material 212 may be configured to bind layers of conductive material 204.1 and 204.2 to layer of insulating material 206.

In some embodiments, composite structure 200 may further include an array (e.g., 1×n array) of conductive materials 216 in one of, or each one of layers of conductive material 204.1 and 204.2, and a second binding material 214 that may be configured to fill in gaps between adjacent conductive materials in the array of conductive materials. In some embodiments, first and second binding materials 212 and 214 may be identical or similar to each other and may be applied and cured in the same or separate process steps. In some embodiments, conductive materials of layers 204.1 and 204.2 may include a suitable high electrically conductive material, such as metals and/or metal alloys. Based on the disclosure herein, a person of ordinary skill in the art will recognize that composite structure 200 having additional layers of conductive materials, layers of insulating material, and/or other elements are within the scope and spirit of this disclosure.

In some embodiments, composite structure 200 may represent a portion of composite structure 110 of transformer 100 and the cross-sectional view of FIG. 2 may be taken along line A-A of FIG. 1. A person of ordinary skill in the art will recognize that the view in FIG. 2 is shown for illustration purposes and may not be drawn to scale. Those skilled in the relevant art will additionally recognize that cross-sectional view of composite structure 200 may not include all of the structures of transformer 100 in its cross-section along line A-A without departing from the spirit and scope of this disclosure. For example, cooling tubes 108 and magnetic core 102 in FIG. 1 are not included in FIG. 2.

Layers of conductive material 204.1 and 204.2 may represent any two adjacent layers from among the plurality of layers of coil windings 104 of transformer 100, and layer of insulating layer 206 may represent layer of insulating layer 106, according to some embodiments. In some embodiments, the above discussion of plurality of layers of coil windings 104 applies to layers of conductive material 204.1 and 204.2, the discussion of layer of insulating layer 106 applies to layer of insulating layer 206, and the discussion of binding material of composite structure 110 applies to first and second binding materials 212 and 214, unless mentioned otherwise. In some embodiments, first and second binding materials 212 and 214 may be inter-coil-winding binding materials of a dry type transformer (e.g., transformer 100).

FIG. 3 is a flow diagram of an example method 300 for fabricating composite monolithic structure 200, according to some embodiments. Steps illustrated in FIG. 3 may be performed in a different order or not performed depending on specific applications. It should be noted that additional processes may be provided before, during, and after method 300, and that some other processes may only be briefly described herein.

Figure 4:
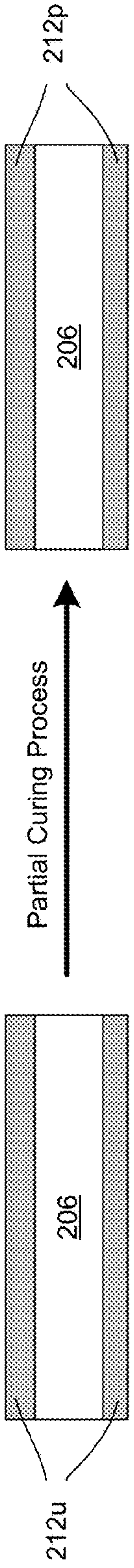
FIGS. 4-6 are schematic cross-sectional views of a composite structure of a transformer at various stages of its fabrication, according to some embodiments.
Figure 5:
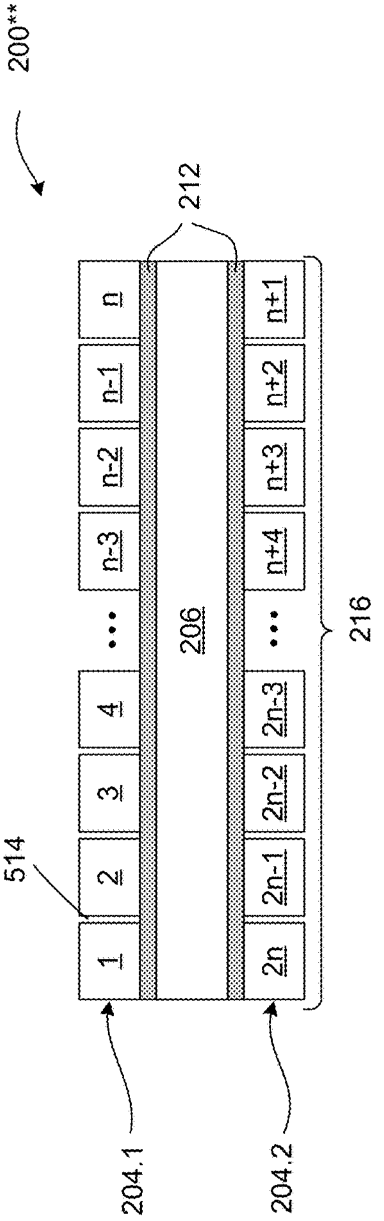
Figure 6:
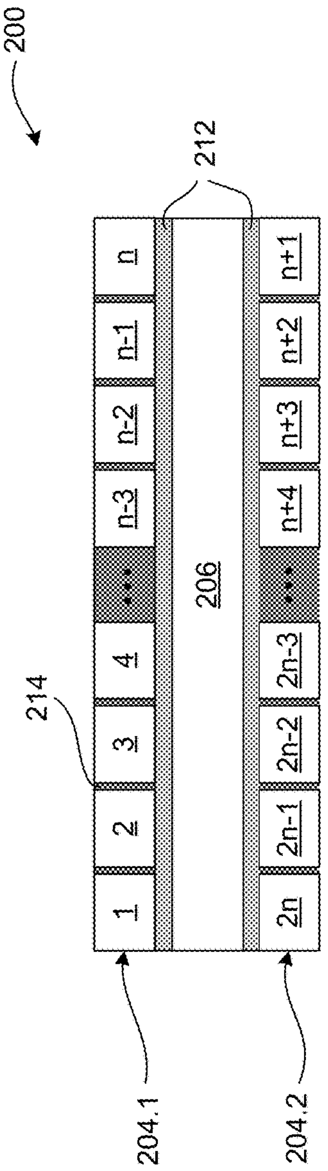

For illustrative purposes, the steps illustrated in FIG. 3 will be described with reference to FIGS. 1-2 and 4-6. FIGS. 4-6 are cross-sectional views of composite structure 200 at various stages of its fabrication, according to some embodiments. A person of ordinary skill in the art will recognize that the views in FIGS. 1-2 and 4-6 are shown for illustration purposes and may not be drawn to scale.

In step 310, a layer of insulating material is coated with a first stage cured binding material that has a non-tacky surface, according to some embodiments. For example, as shown in FIG. 4, layer of insulating material 206 may be coated with first stage cured binding material 212*p*. In some embodiments, the coating with first stage cured binding material 212*p* may include coating layer of insulating material 206 with uncured binding material 212*u* and performing a first stage curing process on the coated layer of insulating material 206 to form first stage cured binding material 212*p*. The coating with uncured binding material 212*u* may include deposition, for example, by spin coating, brushing, and/or spraying a solution of a layer of substantially uniform thickness of uncured binding material 212*u* on one or more sides of layer of insulating material 206 and/or dipping layer of insulating material 206 in a solution of uncured binding material 212*u* to form a layer of substantially uniform thickness of uncured binding material 212*u*. The curing process may include first stage curing the deposited layer of uncured binding material 212*u* on the coated layer 206, for example, by a thermal treatment, radiation, and/or a curing agent. First stage curing of uncured binding material 212*u* may include treating uncured binding material 212*u* at an operating temperature that renders the surface of the first stage cured binding material 212*p* non-tacky. This non-tacky surface of first stage cured binding material 212*p* may facilitate the fabrication of composite structures such as those described in FIGS. 1 and 2.

In some embodiments, the non-tacky surface of first stage cured binding material 212*p* may not bind to materials of adjacent layers (e.g., layers of conductive material 204.1 and 204.2 and second binding material 214 as described in FIG. 2) and allow sliding-displacement of the adjacent layers and/or materials during fabrication of the composite structures until first stage cured binding material 212*p* undergoes a second curing process. During and subsequent to the second curing process, the non-tacky surface of first stage cured binding material 212*p* may merge with the adjacent layers and/or materials into a single cured insulating layer binding the composite structure into a monolithic structure. The use of low friction-coefficient of the non-tacky surface during fabrication of the composite structures may help to achieve tight winding, elimination of air between the adjacent layers, and minimization of overall volume of the composite structures.

In some embodiments, uncured binding material 212*u* may be a resin such as, for example, epoxy or polyester that may have an ability to be cured in two stages at two different times to form first stage cured binding material 212*p* at a first stage that has a non-tacky surface and a substantially uniform thickness and to form second stage cured binding material 212 at a second curing stage.

Referring to FIG. 3, in step 320, a multilayered structure including the coated layer of insulating material and one or more layers of conductive material is formed, according to some embodiments. For example, one or more layers of insulating material 206 coated with first stage cured binding material 212*p* may be placed between layers of conductive material 204.1 and 204.2 (not shown) to reduce the magnitude of electric fields between the conductive layers, and consequently, increasing the breakdown voltage capability.

In step 330, a curing process is performed on the multilayered structure of step 320, according to some embodiments. For example, referring to the example of FIG. 4, multilayered structure of one or more binding material 212*p* coated layers of insulating material 206 and layers of conductive material 204.1 and 204.2 may be cured to form second stage cured binding material 212 that may bind layer of insulating material 206 to layers of conductive material 204.1 and 204.2. The curing process per the binding material manufacturer's process may include exposure of the multilayered structure to a controlled temperature environment over a prescribed time period to complete the polymerization or cross-linking of first stage cured binding material 212*p* and form second stage cured binding material 212. The use of first stage cured non-tacky biding material 212*p* of uniform thickness coated layer of insulating material 206 may help to prevent formation of air pockets in second stage cured binding material 212, as adjacent partially coated binding material coalesce into a single binding layer in absence of air. The formation of air pockets may be also be prevented as first stage cured binding material may be structurally stable during the final cure (also referred as second stage cure in some embodiments). The mechanical stability also is one of the merits of this disclosure as the physical configuration of the complex composite structure is typically maintained under tension during final cure and such configuration remains invariant and held by the second stage cured binding material. With the use of first stage cured binding material 212*p*, there may be no uncured binding material to flow out from the interfaces between layer of insulating material 206 and layers of conductive material 204.1 and 204.2 during the formation of second stage cured binding material 212. In contrast, current methods of fabricating composite structures (e.g., composite structure 200* shown in FIG. 7) may introduce binding material (e.g., binding materials 212* and 214* shown in FIG. 7) after the composite structure comprised of coil-windings (e.g., layers of conductive material 204.1, 204.2 shown in FIG. 7) and insulating material (e.g., layer of insulating material 206 shown in FIG. 7) are assembled using Vacuum Pressure Impregnation ("VPI") processes. In current methods, air is removed from the composite structure in a vacuum chamber. However due to the geometries of 200* and flow dynamics of binding material 212* and 214* during impregnation, some air may remain, as illustrated by 720 in FIG. 7, in interstitial spaces between layer of insulating material 206 and layers of conductive material 204.1 and 204.2. Subsequently, in current methods, resin may be introduced into the composite structure under pressure. The flow of resin into the aforementioned interstitial spaces may not be uniform and non-uniformities in the composite structure may cause imperfect impregnation of the binding material (e.g., binding materials 212* and 214* shown in FIG. 7). Furthermore, in current methods, curing of the binding material is performed at elevated temperature, at which the viscosity of the binding material is lowered. Therefore, in current methods, during the curing process, the binding material flows out of interstitial spaces and air replaces the volumes left by the binding material. As a result, there are air pockets, as illustrated by 720 in FIG. 7, in the completed structure, which degrade electrical, thermal and mechanical performance.

In step 340, air gaps in the cured multilayered structure of step 330 are filled with a cured binding material, according to some embodiments. For example, with reference to the examples of FIGS. 5 and 6, air gaps 514 in second stage cured structure 200 of FIG. 5 may be filled with cured binding material 214. Air gaps 514 may be present between adjacent conductive materials in array 216 (e.g., between adjacent coil turns of transformer 100). In some embodiments, the filling of air gaps 514 with cured binding material 214 may include introducing an uncured binding material in air gaps 514** by a VPI process followed by a curing process.

In some embodiments, the VPI process may include placing second stage cured structure 200 in a vacuum chamber to remove air from air gaps 514 and introducing a solution of uncured binding material (e.g., resin) to second stage cured structure 200** without breaking vacuum. The VPI process may further include providing a temperature to reduce viscosity of the introduced uncured binding material to facilitate its flow into air gaps 514 and pressurizing the chamber to force the introduced uncured binding material into air gaps 514. The VPI process may be followed by a curing process that may include thermally treating the introduced binding material at a temperature sufficient to achieve polymerization or cross-linking of the binding material to form cured binding material 214 in composite structure 200, as shown in FIG. 6**.

In some embodiments, step 340 may not be performed if layers of conductive material 204.1 and 204.2 are continuous layers and do not include array of conductive materials 216.

In some embodiments, prior to the VPI process in step 340, textile fibers may be placed within air gaps 514 to help with retention of uncured binding material within air gaps 514 during the VPI and curing processes. Due to gravity, some of the uncured binding material introduced in air gaps 514 in step 340 may flow out during the VPI and curing processes. The textile fibers may be selected such that they have wicking properties which through surface tension may retain and minimize the out-flow of uncured binding material from air gaps 514. In some embodiments, textile fibers may include insulating material such as, for example, glass fiber, polyester fiber, or a combination thereof. The out-flow of binding material from air gaps 514 may result in introduction of air in the volume left by the loss of binding material. As discussed above, presence of air in composite structures (e.g., composite structure 200) may have negative impact on the performance and reliability of the electrical device (e.g., transformer 100).

Additionally or alternatively to textile fibers in air gaps 514 discussed above, conductive materials (e.g., coils) of array 216 may be covered with textile fibers to help with retention of uncured binding material during the VPI and curing processes of step 340. The textile fibers may be selected such that they absorb the uncured binding material introduced during the VPI process and retain by surface tension the uncured binding material within air gaps 514 until the curing process is completed.

Additionally or alternatively to textile fibers in air gaps 514 and around conductive materials of array 216 discussed above, additives and/or inert aggregates may be added to the solution of uncured binding material prior to its introduction into structure 200 during the VPI process of step 340. Additives and/or inert aggregates may help to retain uncured binding material within air gaps 514** during the VPI and curing processes.

In some embodiments, adding additives to the solution of uncured binding material may impart thixotropic properties such that under pressure (e.g., during the VPI process of step 340) the viscosity of the thixotropic solution of uncured binding material is reduced and under equilibrium (e.g., during the curing process of step 340) the viscosity is increased. In some embodiments, adding inert aggregates such as silica may counter the effects of gravitational forces with surface tensional forces from the aggregates. The dimensions of aggregates may be tailored to that of air gaps 514.

Based on the disclosure herein, a person of ordinary skill in the art will recognize that example method 300 of FIG. 3 is not limited to a transformer, but may be applied to other electrical devices (e.g., high voltage devices, surge protection devices, and/or devices having electric fields and insulating systems, to name just some examples) having composite structures of conductive layers coupled to insulating layers.

Referring back to FIGS. 1-6, in some embodiments, the above discussed method 300 may help to reduce the thickness of layer of insulating material 206 used in composite structure 200, as proper selection of second stage cured binding material 212 may provide substantially higher dielectric field strength than layer of insulating material 206. In some embodiments, binding material 212 may include epoxy resin that may have a dielectric field strength ranging from about 400 V/mil to about 4000 V/mil. This dielectric field strength is greater than that of layer of insulating material 206 having, for example, Nomex that may have a dielectric field strength of about 40 V/mil. Furthermore, reduction of insulating layer thickness may improve thermal dissipation, and consequently, lower the operating temperature of composite structure 200 and increase operational life of composite structure 200 with the benefit of reduced life cycle cost.

In some embodiments, the above discussed method 300 provides a process for fabricating composite structures (e.g., composite structure 110, 200) of electrical device (e.g., transformer 100) without formation of air pockets, for example, in second stage cured biding material 212 at interfaces between layers of insulating material 206 and conductive material 204.1 and 204.2, and/or in cured binding material 214 in spaces between conductive materials (e.g., coil turns of transformer 100) of array 216. Method 300 may help to substantially reduce or completely eliminate air pockets by preventing its formation in the fabrication of composite structures (e.g., composite structure 110, 200) of electrical devices (e.g., transformer 100). Prevention of air pocket formation in the design and method of manufacture may lead to fabrication of more reliable composite structures of electrical devices (e.g., high voltage power equipment) compared to other composite structures fabricated using current methods.

Figure 7:
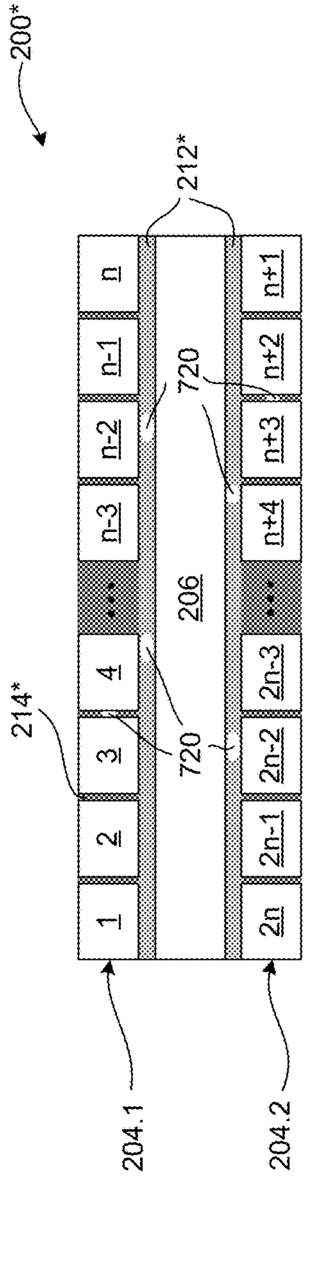
FIG. 7 is a schematic cross-sectional view of a composite structure of a transformer, according to some embodiments.

Current methods of fabricating composite structures of electrical devices may use a VPI process followed by a curing process to form a composite structure 200* (shown in FIG. 7), which may be similar to composite structure 200. Although air is removed from 200* by evacuation of air molecules in the vacuum environment, and replaced by pressurized binding material 212* and/or 214* during impregnation, during subsequent curing of the binding material at higher temperature, the binding material is not completely retained in composite structure 200*, as viscosity of the binding material is lowered at high curing temperature and leaks out of composite structure 200*. The volume left by the binding material that was not retained in composite structure 200* is thus replaced by air in the curing oven. Because of poor binding material retention during cure after VPI, cured biding material 212* at interfaces between layers of insulating material 206 and conductive material 204.1 and 204.2 and/or cured binding material 214* in spaces between conductive materials of array 216 formed with the VPI and curing processes using current fabrication methods may still contain air pockets. This result is shown in FIG. 7, composite structure 200* may have air pockets 720 in cured binding materials 212* and 214*. These air pockets 720 may be formed due to poor retention of uncured binding material associated with the curing process following the VPI process, as discussed above.

Figure 8:
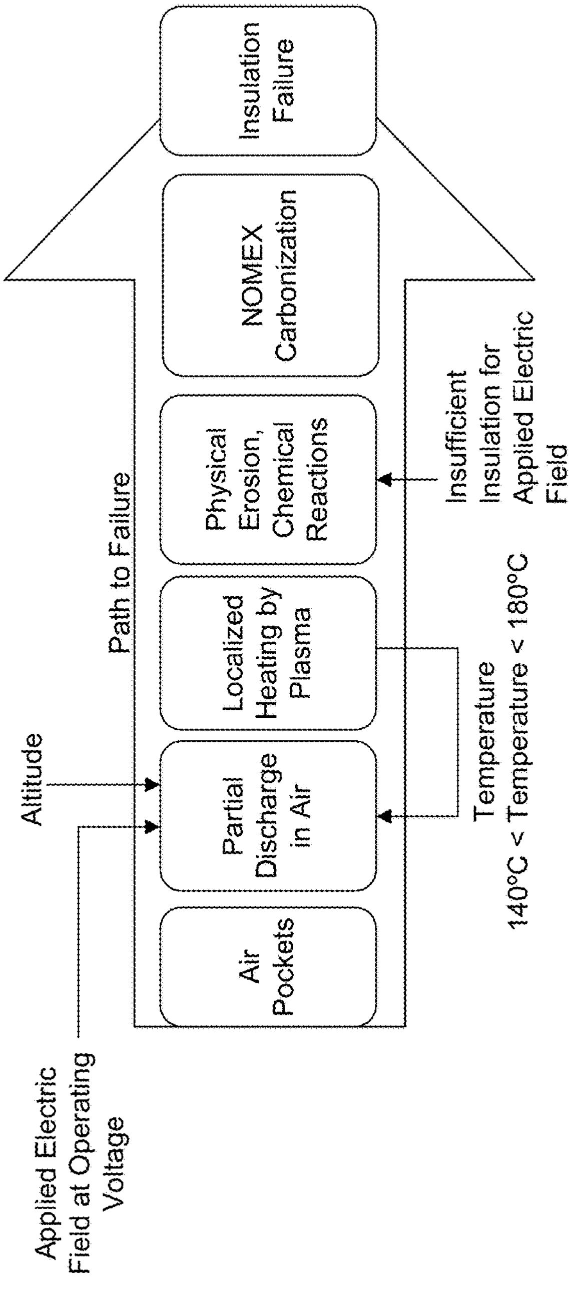
FIG. 8 is schematic illustration of example problems associated with a current fabrication method of a composite structure of a transformer, according to some embodiments.

The presence of air pockets 720 in composite structure 200* degrades the reliability and performance of the electrical device (e.g., transformer) having composite structure 200* because the breakdown voltage of air is substantially lower than that of adjacent insulating materials operating in intense electric fields, and the energy released in such breakdown damages the insulating materials. FIG. 8 illustrates a sequence of events that may lead to the degradation and eventual failure of composite structure 200*. The degradation may be due to partial discharge in air pockets 720 that take place at lower electric fields than that of insulating materials (e.g., cured binding materials 212* and 214* and layer of insulating material 206). Partial discharge is exacerbated by altitude and temperature. The energy of voltage breakdown of air in air pockets 720 may cause a plasma, with release of nitrogen and oxygen molecules in air pockets 720, and/or may cause physical erosion and chemical reactions that may eventually destroy the insulating material (e.g., cured binding materials 212* and 214* and layer of insulating material 206) with eventual electrical failure of composite structure 200*.

Figure 9:
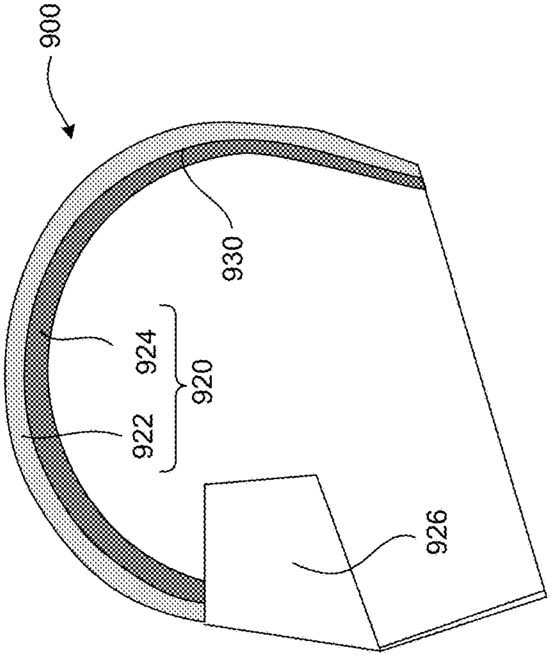
FIG. 9 is a schematic cross-sectional view of a protective gear having a composite structure, according to some embodiments.

FIG. 9 illustrates a cross-sectional view of a protective head gear 900, according to some embodiments. Protective head gear 900 may include a composite structure 920 having first and second layers 922 and 924 and a wind shield 926. Based on the disclosure herein, a person of ordinary skill in the art will recognize that protective head gear 900 having other parts and composite structure 920 having more than two layers are within the scope and spirit of this disclosure. For clarity, composite structure 920 is discussed in further detail below, and other parts of protective head gear 900 are not discussed in the present disclosure.

In some embodiments, first layer 922 may be configured to be an outer protective shell of protective head gear 900 and may include one or more reinforced fiber sheets. The one or more reinforced fiber sheets may include glass fiber, carbon fiber, titanium fiber, aramid fiber, silicon carbide fiber, and/or Kevlar® in a matrix material. The matrix material may include a resin such as, for example, epoxy and/or polyester.

In some embodiments, second layer 924 may be configured to be an impact absorbing layer and may include an insulating material (e.g., polystyrene). First and second layers 922 and 924 may be bound to each other at interface 930 by a cured binding material (not shown). In some embodiments, the cured binding material may include a resin such as, for example, epoxy and/or polyester. In some embodiments, the cured binding material may include the matrix material of the one or more reinforced fiber sheets of first layer 922.

Figure 10:
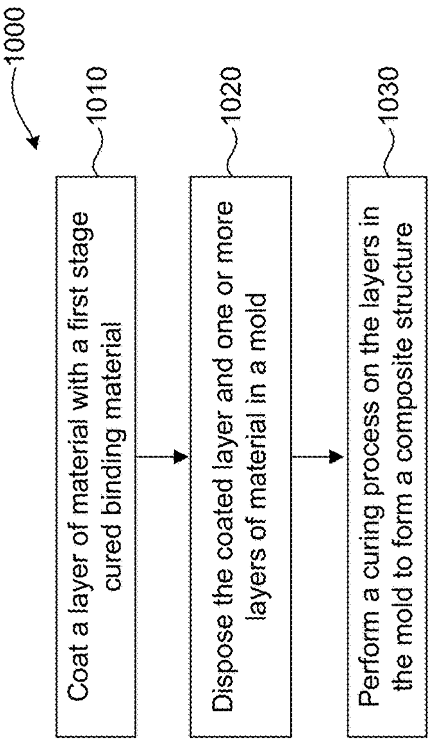
FIG. 10 is a flow diagram of a method for fabricating a composite structure, according to some embodiments.

FIG. 10 is a flow diagram of an example method 1000 for fabricating composite structure 920 of protective head gear 900, according to some embodiments. Steps illustrated in FIG. 10 may be performed in a different order or not performed depending on specific applications. It should be noted that additional processes may be provided before, during, and after method 1000, and that some other processes may only be briefly described herein.

Figure 11:
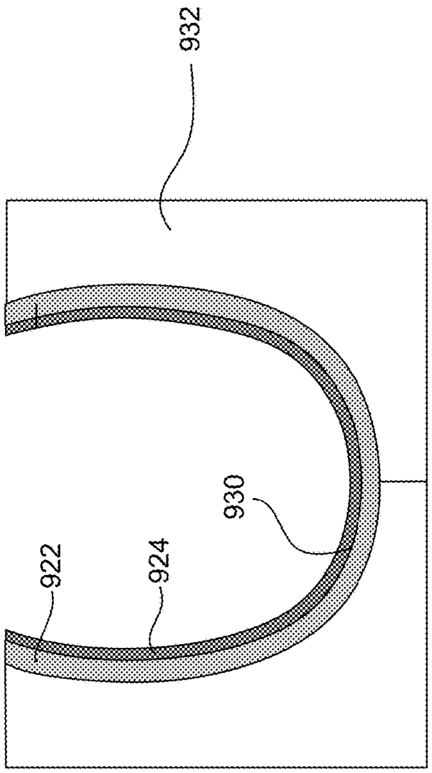
FIG. 11 is a schematic cross-sectional view of a composite structure at a stage of its fabrication, according to some embodiments.

For illustrative purposes, the steps illustrated in FIG. 10 will be described with reference to FIGS. 9 and 11. FIG. 11 is a cross-sectional view of composite structure 920 at a stage of its fabrication, according to some embodiments. A person of ordinary skill in the art will recognize that the views in FIGS. 9 and 11 are shown for illustration purposes and may not be drawn to scale. The mold in FIG. 11 is a shape template and can be external or internal to 900. In non-planar applications such as 900, the selection of conformal textiles in the design may facilitate and streamline fabrication of composite structure 900.

In step 1010, a layer of material is coated with a first stage cured binding material, according to some embodiments. For example, first layer 922 and/or second layer 924 may be coated with a first stage cured binding material. In some embodiments, the coating with first stage cured binding material may include coating first layer 922 and/or second layer 924 with an uncured binding material and performing a curing process on the coated first layer 922 and/or second layer 924 to form first stage cured binding material on first layer 922 and/or second layer 924. The coating with uncured binding material may include, for example, spin coating, brushing, and/or spraying a solution of uncured binding material on one or more sides of first layer 922 and/or second layer 924, and/or dipping first layer 922 and/or second layer 924 in a solution of uncured binding material. The curing process may include first stage curing the uncured binding material on first layer 922 and/or second layer 924, for example, by a thermal treatment, a UV radiation, and/or a curing agent. First stage curing of the uncured binding material may include treating the uncured binding material at an operating temperature below the activation point of polymerization or cross-linking of the uncured binding material. In some embodiments, the uncured binding material may be a resin such as, for example, epoxy and/or polyester that may have an ability to be cured in two stages at two different times to form first stage cured binding material at a first stage, and to form second stage cured binding material at a second stage.

In some embodiments, instead of coating first layer 922 with a first stage cured binding material, the matrix material of first layer 922 may be first stage cured during formation of the reinforced fiber sheet of first layer 922. As such, the matrix material may be used to bind to first layer 922 to other layers (e.g., second layer 924) when the matrix material is fully cured (also referred as second stage cured in some embodiments) in a subsequent curing process (e.g., in step 1030).

In step 1020, the coated layer of material is disposed in a mold, according to some embodiments. For example, as shown in FIG. 11, first and second layers 922 and 924 of step 1010 are disposed in a mold 932 to achieve the cross-sectional shapes of first and second layers 922 and 924 shown in FIG. 9.

In step 1030, a curing process is performed on the coated layer of material in the mold, according to some embodiments. For example, first and second layers 922 and 924 in mold 932 may be cured to form a cured binding material at interface 930 to bind first and second layers 922 and 924 to each other. The curing process may include treating first and second layers 922 and 924 in mold 932, for example, by a thermal treatment or pressure to complete the polymerization or cross-linking of first stage cured binding material of step 1010 and form the second stage cured binding material at interface 930.

The use of first stage cured biding material in method 1000 may help to prevent formation of air pockets in the second stage cured binding material at interface 930. The formation of air pockets may be prevented as there is no uncured binding material to flow out from interface 930 during the curing process of step 1030. Air pockets may reduce the mechanical properties (e.g. tensile strength) of composite structure 900.

Current methods of fabricating composite structures similar to composite structure 920 include adding a solution of uncured binding material to uncoated layers in a mold followed by a curing process. However, some of the uncured binding material may flow out from the interface between the layers in the mold, for example, due to gravity, and as a result, form unwanted air pockets at the interface between layers of composite structure, and accumulate in undesirable locations resulting in non-uniformities in the finished product. Such air pockets may lower the binding strength between layers of the composite structure, and consequently, have a negative impact on the structural integrity of these structures and protective head gear.

Based on the disclosure herein, a person of ordinary skill in the art will recognize that the use of method 1000 to form similar composite structures, for example, in body armors, in parts of aircrafts, boats, cars, or other structures that need lightweight, rigid, and reliable composite structures are within the scope and spirit of this disclosure.

Figure 12:
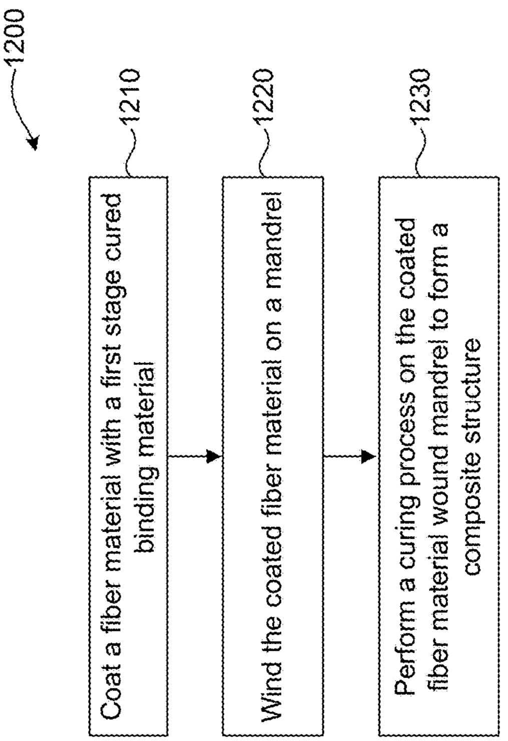
FIG. 12 is a flow diagram of a method for fabricating a composite structure, according to some embodiments.

FIG. 12 is a flow diagram of an example method 1200 for fabricating a fiber wound composite structure, according to some embodiments. Steps illustrated in FIG. 12 may be performed in a different order or not performed depending on specific applications. It should be noted that additional processes may be provided before, during, and after method 1200, and that some other processes may only be briefly described herein.

Figure 13:
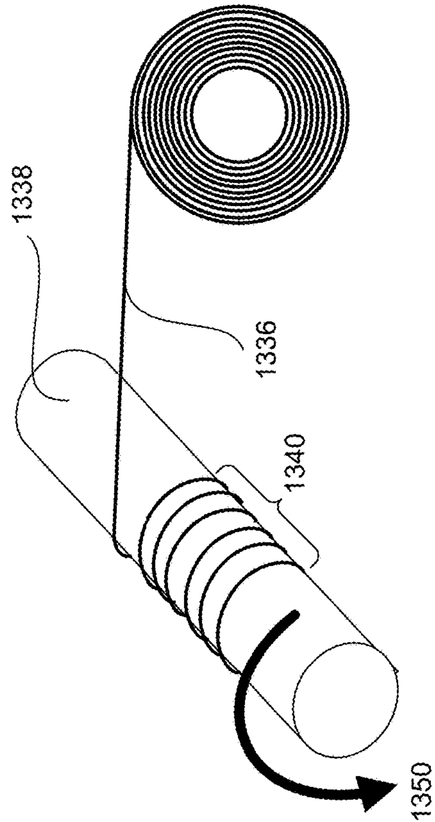
FIG. 13 is a schematic of a fabrication process of a composite structure, according to some embodiments.

For illustrative purposes, the steps illustrated in FIG. 12 will be described with reference to FIG. 13. FIG. 13 is a schematic of a fiber wound composite structure at a stage of its fabrication, according to some embodiments.

In step 1210, a fiber material may be coated with a first stage cured binding material, according to some embodiments. For example, an uncoated fiber material (not shown) may be coated with a first stage cured binding material to form coated fiber material 1336. In some embodiments, the coating with first stage cured binding material may include incorporating silicon carbide whiskers, and/or nano-materials in coating the uncoated fiber material with an uncured binding material and performing a curing process to form first stage cured binding material on coated fiber material 1336. In some embodiments, 1336 can be comprised of a single or multiple fibers in accordance with the design to achieve the desired performance characteristics. The coating with uncured binding material may include, for example, spin coating, brushing, and/or spraying a solution of uncured binding material on the uncoated fiber material and/or dipping the uncoated fiber material in a solution of uncured binding material.

The curing process may include first stage curing the uncured binding material, for example, by a thermal treatment, a UV radiation, and/or a curing agent. First stage curing of the uncured binding material may include treating the uncured binding material at an operating temperature below the activation point of polymerization or cross-linking of the uncured binding material. In some embodiments, the uncured binding material may be a resin such as, for example, epoxy and/or polyester that may have an ability to be cured in two stages at two different times to form first stage cured non-tacky binding material at a first stage and to form second stage cured binding material at a second stage.

In some embodiments, the fiber material may include tapes and/or strands of glass fiber, carbon fiber, titanium wire, aramid fiber, silicon carbide enforced fiber, and/or Kevlar, to name just some examples.

In step 1220, the coated fiber material may be wound on a mandrel, according to some embodiments. For example, as shown in FIG. 13, coated fiber material 1336 may be wound on a mandrel 1338 while mandrel 1338 may be rotated in a direction 1350. Mandrel 1338 may be a 3-D template and wound structure 1340 may be take the shape of mandrel 1338. Shape of mandrel 1338 is for illustration purpose and is not limited to cylindrical shape shown in FIG. 13. Shape of mandrel 1338 may depend on the shape of the fiber wound composite structure being fabricated.

In step 1230, a curing process may be performed on the fiber material wound mandrel, according to some embodiments. For example, wound structure 1340 on mandrel 1338 may be cured to form a fiber wound composite structure. The fiber wound composite structure may have the shape of mandrel 1338, which may be removed after the curing process. The curing process may include treating wound structure 1340 on mandrel 1338, for example, by a thermal treatment or pressure to complete the polymerization or cross-linking of first stage cured binding material on coated fiber material 1336. Thus, the fiber wound composite structure may have a fiber reinforced layer formed in a cured matrix of the binding material.

Method 1200 provides a dry and convenient process for forming the fiber wound composite structures. Also, the use of first stage cured binding material in method 1000 may help to prevent formation of air pockets in the fiber wound composite structure and consequently, avoid the problems associated with the presence of air pockets in composite structures discussed above. The formation of air pockets may be prevented as there is no uncured binding material to drip from coated fiber material during the winding of coated fiber material 1336 to form wound structure 1340. Method 1200 provides a convenient process for incorporating novel materials e.g. silicon carbide fibers and nano-materials to enhance the thermal, mechanical and electrical properties of composite structures using the disclosed fabrication method.

Figure 14:
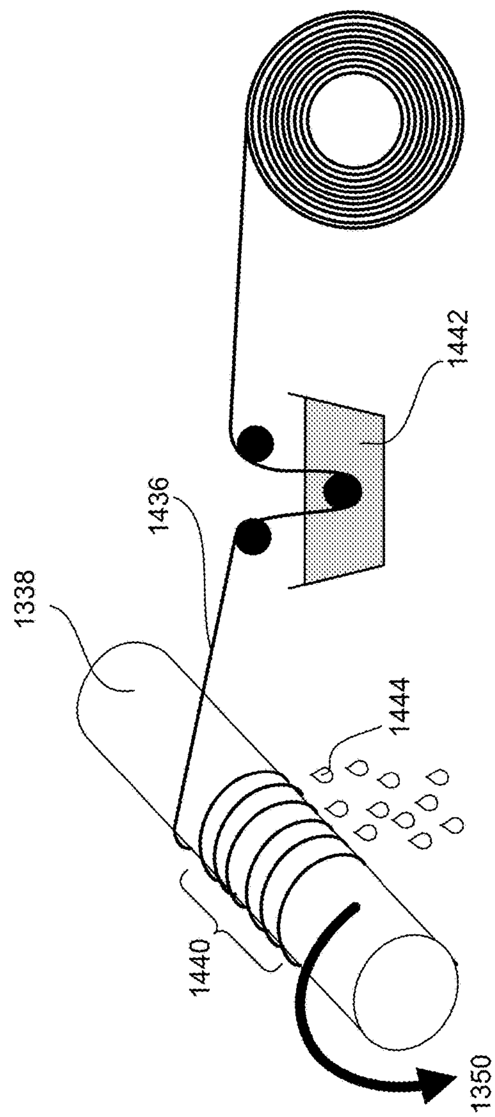
FIG. 14 is a schematic of a fabrication process of a composite structure, according to some embodiments.

Current methods of fabricating fiber wound composite structures are wet processes as illustrated in FIG. 14. In current methods, a fiber material 1436 may be passed through a solution of uncured biding material 1442 as fiber material 1436 is wound on rotating mandrel 1338. Some of the uncured binding material may drip (e.g., droplets 1444) from wound structure 1440. Such dripping of uncured binding material creates inefficiencies and need to clean equipment and work area. It is a complicated process to use and air pockets may be formed due to the loss of binding material during the curing process as discussed above. Such air pockets may have a negative impact on the structural integrity of these fiber wound composite structures.

In some embodiments, method 1200 may be used to form fiber wound composite nose cone structures of missiles, aircrafts, and/or spacecraft. Shape of mandrel 1338 may be selected depending on the shape of the composite nose cone structure. In some embodiments, method 1200 may be used to form fiber wound composite components of bicycles or high strength light weight structures e.g. wheel rims. Shape of mandrel 1338 may be selected depending on the shape of the composite structure of interest.

Based on the disclosure herein, a person of ordinary skill in the art will recognize that the use of method 1200 to form other fiber wound composite structures for applications, for example, automotive, marine, aircraft, and/or spacecraft industries that need lightweight, rigid, and reliable composite structures with or without electrical performance attributes are within the scope and spirit of this disclosure.

CONCLUSION

It is to be appreciated that the Detailed Description section is intended to be used to interpret the claims. Other sections can set forth one or more but not all exemplary embodiments as contemplated by the inventor(s).

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the structure and operation illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A composite monolithic structure in an electrical device, comprising:

an array of conductive structures, comprising at least a first layer of conductive structures and a second layer of conductive structures;

an array of insulating regions, comprising at least a first layer of insulating regions and a second layer of insulating regions, wherein first insulating regions of the first layer of insulating regions and first conductive structures of the first layer of conductive structures are positioned in an alternating configuration with respect to each other to form a first conductive layer, and wherein second insulating regions of the second layer of insulating regions and second conductive structures of the second layer of conductive structures are positioned in an alternating configuration with respect to each other to form a second conductive layer;

a first insulating layer coupled to the first conductive layer and the second conductive layer and having a first dielectric field strength; and a second insulating layer positioned to couple a first side of the first insulating layer to the first conductive layer, and a second side of the first insulating layer to the second conductive layer having a second dielectric field strength that is greater than the first dielectric field strength.

2. The composite monolithic structure of claim 1, wherein each of the insulating regions comprises a silica aggregate.

3. The composite monolithic structure of claim 1, wherein each of the insulating regions comprises a fiber material.

4. The composite monolithic structure of claim 1, further comprising a fiber material wrapped around one of the conductive structures of the array of conductive structures.

5. The composite monolithic structure of claim 1, wherein the second insulating layer comprises a cured binding material having the second dielectric field strength.

6. The composite monolithic structure of claim 5, wherein the cured binding material is a second stage cured binding material.

7. The composite monolithic structure of claim 1, wherein the second dielectric field strength ranges from 400 V/mil to 4000 V/mil.

8. The composite monolithic structure of claim 1, wherein the electrical device is a transformer.

* * * * *